United States Patent Office 3,409,633
Patented Nov. 5, 1968

3,409,633
WATER-SOLUBLE PHTHALOCYANINE DYE-STUFFS AND PROCESS FOR PREPARING THEM
Hartmut Springer, Frankfurt am Main, Germany, assignor to Farbwerke Hoechst Aktiengesellschaft vormals Meister Lucius & Bruning, Frankfurt am Main, Germany, a corporation of Germany
No Drawing. Filed Mar. 23, 1965, Ser. No. 442,197
Claims priority, application Germany, Mar. 26, 1964, F 42,437
8 Claims. (Cl. 260—314.5)

The present invention relates to new water-soluble phthalocyanine dyestuffs and to a process for preparing them; in particular, the invention relates to phthalocyanine dyestuffs of the general formula

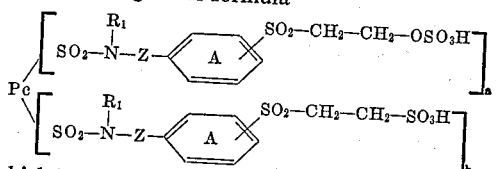

in which Pc represents a metal-containing phthalocyanine nucleus which may be substituted by groups which do not impart solubility in water, $R_1$ represents a hydrogen atom or an alkyl group containing 1 to 5 carbon atoms which may be substituted by groups which impart or do not impart solubility in water, Z represents the group of the formula $-(CH_2)_q-$ or the group of the formula

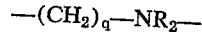

in which $q$ stands for an integer from 1 to 6 and $R_2$ represents a hydrogen atom or an alkyl group containing 1 to 5 carbon atoms and wherein $R_1$ and $R_2$ may be linked together to form a ring, the benzene nuclei A may contain further substituents and $a$ stands for a number from 1 to 4 and $b$ for a number from 0 to 3, the sum of $a$ and $b$ being at least 2 and at most 4.

Belgian Patent No. 600,946 describes water-soluble phthalocyanine dyestuffs of the formula

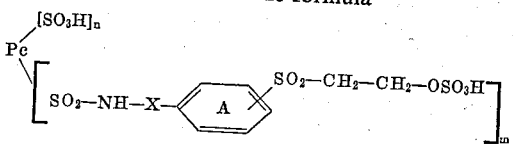

in which Pc represents a metal-containing phthalocyanine nucleus and X represents a bivalent organic radical, for example, the group $-(CH_2)_2-$ or the group

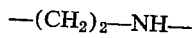

the benzene nucleus A may contain further substituents, for example, a nitro group, and $m$ and $n$ stand for integers from 1 to 3, the sum of $m$ and $n$ not exceeding 4.

The known dyestuffs of Formula 1 may be prepared, for example, by condensing amines of the Formula 2

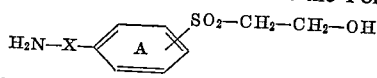

in which X is defined as above and benzene nucleus A may be substituted in the manner described above, with phthalocyanine sulfonic acid chlorides and converting the products obtained into their sulfuric acid esters. The first stage of the process, i.e., the condensation of the phthalocyanine-sulfonic acid chlorides with the amines of Formula 2 is carried out in such a way that part of the sulfonic acid chloride groups of the phthalocyanine compound used are simultaneously hydrolized to form sulfonic acid groups. In practice, this is done, for example, by using an amount of the amine of Formula 2 insufficient to provide complete condensation and sulfonamide formation of all the sulfonic acid chloride groups present in the phthalocyanine derivative used.

Now I have found that new water-soluble phthalocyanine dyestuffs of the general Formula 3.

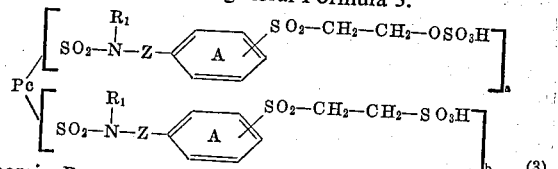

wherein Pc represents a metal-containing phthalocyanine nucleus which may be substituted by groups which do not impart solubility in water, $R_1$ represents a hydrogen atom or an alkyl group containing 1 to 5 carbon atoms which may be substituted by groups which impart or do not impart solubility in water, Z represents the group $-(CH_2)_q-$ or the group $-(CH_2)_q-NR_2-$ in which $q$ stands for an integer from 1 to 6 and $R_2$ represents a hydrogen atom or an alkyl group containing 1 to 5 carbon atoms, and wherein $R_1$ and $R_2$ may be linked together to form a ring, benzene nuclei A may contain further substituents and $a$ stands for a number from 1 to 4 and $b$ for a number from 0 to 3, the sum of $a$ and $b$ at least 2 and at most 4, can be prepared by condensing amines of the general Formula 4

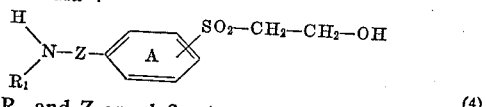

wherein $R_1$ and Z are defined as above and the benzene nucleus A may be substituted in the manner described above, with phthalocyanine-sulfonic acid chlorides, subsequently converting the products obtained into their sulfuric acid esters and, if desired, treating them with alkali metal sulfite.

When carrying out the condensation described above care must be taken to ensure that all the sulfonic acid chloride groups present in the phthalocyanine compound used are completely reacted with the araliphatic amines of Formula 4 which contain β-hydroxyethylsulfonyl groups to form the sulfonamide compound. The condensation products obtained are then converted into their sulfuric acid esters by known methods and, if desired, subjected to an after-treatment with sulfite, which has the effect of transforming part of the $-SO_2-CH_2-CH_2-OSO_3H-$ groups into $-SO_2-CH_2-CH_2-SO_3H-$ groups.

It is characteristic of the water-soluble reactive dyestuffs of the phthalocyanine series, which correspond to Formula 3 and are obtained according to the process of the present invention, that they do not contain groups imparting solubility in water directly linked to the metal-containing phthalocyanine nucleus Pc which may be substituted by groups which do not impart solubility in water, such, for example, as alkyl, alkoxy, phenyl, benzoyl, phenylsulfonyl or acylamino groups. One alkyl radical $R_1$ of the dyestuffs obtainable according to the process of the invention may also be substituted by groups which impart or do not impart solubility in water. In this case, there may be mentioned as groups imparting solubility in water, which are linked to the alkyl radical $R_1$, for example carboxylic acid or sulfonic acid groups; among the groups which do not impart solubility in water there may be mentioned as substituents of the alkyl radical $R_1$, for example halogen atoms, hydroxy, alkoxy or acylamino groups. Further substituents which may be contained in the benzene nucleus A are, for example, hydroxy, alkoxy, carboxylic acid, sulfonic acid, acylamino or nitro groups as well as halogen atoms.

Phthalocyanine derivatives suitable as starting materials for the process of the present invention are, for example, di-, tri- or tetrasulfonic acid chlorides of metal-containing phthalocyanines or mixtures thereof, wherein the sulfonic acid chloride groups are present either at the annulated benzene nuclei of the macrocyclic ring or at aryl radicals which may be linked directly or by means of bridge members, such as —CO— or —SO$_2$—, to the phthalocyanine nucleus. As complex-bound metals in the phthalocyanine nucleus Pc of the metal-containing phthalocyanine derivatives of the type mentioned above there may be mentioned, for example, copper, nickel, cobalt or iron. Suitable sulfonic acid chlorides are for example the following: copper phthalocyanine-(3)-tetrasulfonic acid chloride, copper phthalocyanine-(4)-tetrasulfonic acid chloride, copper phthalocyanine-(3)-tri-sulfonic acid chloride, nickel phthalocyanine-(3)-tetrasulfonic acid chloride, copper phthalocyanine-(3)-disulfonic acid chloride and tetraphenyl-copper-phthalocyanine-tetrasulfonic acid chloride.

The metal-containing phthalocyanine-sulfonic acid chlorides used as starting substances according to the process of the invention can be prepared in known manner, for example by treating the corresponding metal-containing phthalocyanines or phthalocyanine-sulfonic acids with chlorosulfonic acid. The sulfochlorination can be effected, if desired, in the presence of carbon tetrachloride or chlorides of acids, such for example as thionylchloride or phosphorus pentachloride, in the manner described for example in German Patent No. 891,121.

As araliphatic amines of Formula 4 containing β-hydroxyethylsulfonyl groups there may be used for the condensation with the corresponding metal-containing phthalocyanine-sulfonic acid chlorides according to the process of the invention derivatives having an unsubstituted amino group as well as N-alkylamines. Among the amines of Formula 4 there may be mentioned, for example the following:

β-Hydroxyethyl-[4-(β-aminoethyl)-phenyl]-sulfone of the formula

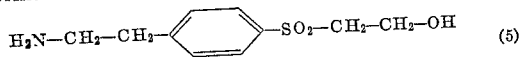 (5)

N-[2-nitro-4-(β-hydroxyethylsulfonyl)-phenyl]-ethylene-diamine of the formula

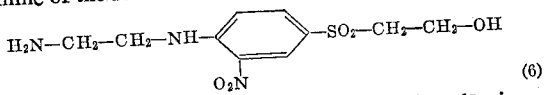 (6)

1-[2′-nitro-4′-(β-hydroxyethylsulfonyl)-phenyl]-piperazine of the formula

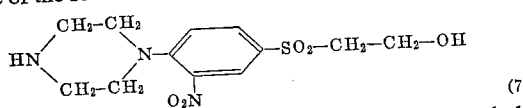 (7)

N-(β-hydroxyethyl)-N′-[2-methoxy-5-(β′-hydroxyethylsulfonyl)-phenyl]-ethylene-diamine of the formula

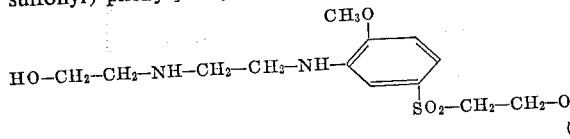 (8)

The amines corresponding to Formulae 5 to 8 given above can be obtained according to the usual processes for the manufacture of such compounds. The compound of Formula 5, for example, is obtained in the form of its hydrochloride by converting Nacetyl-β-phenylethylamine by treatment with chlorosulfonic acid into the 4-[(β-acetylamino)-ethyl]-benzenesulfonic acid chloride, the latter is reduced to form the corresponding sulfonic acid which is reacted with ethylene oxide or β-chloroethanol; the reaction product is then hydrolized with hydrochloric acid. The amine of Formula 7 can be prepared, for example, by reacting β-hydroxyethyl-[(3-nitro-4-chloro)-phenyl]-sulfone with piperazine.

For carrying out the process of the present invention the amines of the general Formula 4 can be used either in the form of free bases or in the form of their water-soluble hydrohalic acid addition salts.

The reaction of phthalocyanine-sulfonic acid chlorides with the amines of the general Formula 4 which constitutes the first stage of the process of the present invention can be carried out in an aqueous or non-aqueous medium, depending on the solubility of the reactants used in solution or in suspension, in the presence of acid-binding agents. For the reaction in a non-aqueous medium there may be used organic solvents or diluents, such for example as methanol, dimethylformamide or pyridine. Suitable acid-binding agents are, for example, sodium bicarbonate, sodium carbonate, sodium hydroxide, tertiary organic bases, such as pyridine or triethylamine, or an excess of the amines of the general Formula 4. The reaction is carried out at pH-values in a weakly acid to alkaline range. The temperature required for the reaction may vary within wide limits. It is usually within the range from about —5° C. to +60° C.

It is characteristic of the first stage of the process of the present invention that the amount of amines of the general Formula 4 used should be calculated so as to ensure that all the sulfonic acid chloride groups of the phthalocyanine-sulfonic acid chlorides are reacted to form sulfonamide groups so that hydrolysis of the sulfonic acid chloride groups into sulfonic acid groups is avoided or can only take place on a very small scale. If, nevertheless, a slight hydrolysis takes place in the course of the reaction, the saponification products formed can be separated from the reaction product without difficulty due to their higher solubility in water.

The second stage of the process of the invention, i.e. the conversion of the phthalocyanine-sulfonamides, which contain β-hydroxyethylsulfonyl groups and are obtained on the first stage of the process, into their sulfuric acid esters is carried out in known manner either by treating the sulfonamides with sulfuric acid or by reacting them with chlorosulfonic acid or sulfur trioxide or their complex compounds with tertiary amines, preferably in a tertiary amine as solvent.

On the second stage of the process of the invention dyestuffs of the general Formula 3 are obtained wherein—in accordance with the number of sulfonic acid chloride groups present in the phthalocyanine compound used as starting substance—a has the value of 2–4 and b has the value of 0. If it is desirable to obtain dyestuffs of Formula 3 wherein the value b does not equal 0, the second stage of the process must be followed by a third reaction stage. On the third stage, the dyestuffs containing β-hydroxy-ethylsulfonyl-sulfuric acid ester groups which have been obtained after the first two stages are treated with an alkali metal sulfite, for instance with sodium sulfite. This treatment has the effect of transforming a part of the β-hydroxyethylsulfonylsulfuric acid ester groups contained in the dyestuff molecule according to the following reaction equation

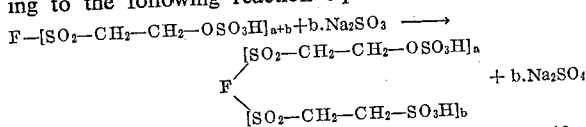

in which F stands for the dyestuff radical, into β-sulfoethylsulfonyl groups. The amount of alkali metal sulfite required for stage 3 should always be calculated so as to ensure that at least one sulfuric acid ester group of the dyestuff molecule remains unmodified.

The new phthalocyanine dyestuffs obtainable according to the process of the invention can be used for dyeing and printing various materials, for example wool, silk, leather or linear polyamides. In particular, the new dyestuffs are suitable for dyeing and printing cellulose-containing materials of fibrous structure, such as linen, regenerated cellulose and, above all, cotton. The dyestuffs are applied to the cellulose fibre for example by treating the material with an aqueous solution of the dyestuff and with an aqueous solution of an agent having an alkaline reaction or an acid-binding agent, such as sodium hydroxide, sodium bicarbonate, trisodium, phosphate or sodium sulfide, or by treatment with a printing paste containing the dyestuff and an acid-binding agent. In addition to acid-binding agents or substances capable of yielding acid-binding agents the dyestuff solutions or printing pastes may contain urea, urethanes or water-soluble amides of aliphatic carboxylic acids, such, for example, as formamide, acetamide or malonic acid diamide. The treatment with acid-binding agents may be carried out before, during or after the application of the dyestuff, if desired, at an elevated temperature.

On the materials mentioned above the new dyestuffs yield dyeing and prints having clear shades ranging from blue to green, which are distinguished by good fastness properties to light and to chlorine and generally by very good properties of wet fastness. Moreover, the dyestuffs obtained according to the process of the invention have a very good affinity for cotton and thus dyeings and prints are obtained which have a high tinctorial strength. As compared with the dyestuffs of similar constitution described in Belgian Patent No. 600,946, especially those obtained in Examples 4 and 5, the dyestuffs obtained according to the process of the invention are distinguished by considerably better properties of wet fastness.

The following examples serve to illustrate the invention but they are not intended to limit it thereto, the parts being by weight unless otherwise mentioned.

Example 1

57 parts of the hydrochloride of β-hydroxyethyl-[4-(β-aminoethyl-phenyl]-sulfone (melting point: 100° C.) of the formula

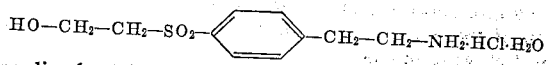

are dissolved in 600 parts of water. 24 parts of a 33% sodium hydroxide solution are added to this solution and then 48.5 parts of copper phthalocyanine-(3)-tetrasulfonic acid chloride are introduced in the form of a moist filter cake. The mixture is then heated to 50° C. while being thoroughly stirred, and the pH-value is kept at 9.5 to 10 by portionwise addition of about 100 parts of 2 N-sodium hydroxide solution. As soon as no more sodium hydroxide solution is consumed the product formed is filtered, washed with warm water until a colorless filtrate runs off and dried at 100° C. The dry reaction product obtained in this manner is introduced in the form of a finely ground powder into 700 parts of concentrated sulfuric acid and stirred for some hours at room temperature. The solution obtained is then poured onto a mixture of ice and NaCl solution, the precipitated ester dyestuff is filtered and washed with NaCl solution until neutral. The moist filter cake is dissolved in 2000 parts of water, the solution is neutralized by means of sodium bicarbonate and the dyestuff isolated by salting out with sodium chloride. 151 parts of a salt-containing, turquoise-blue dyestuff of the following formula

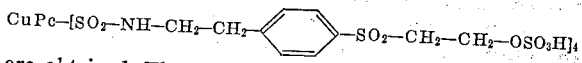

are obtained. The dyestuff is easily soluble in water and may be used for dyeing and printing materials of natural and regenerated cellulose. In the presence of acid-binding agents dyeings and prints are obtained which show an excellent fastness to washing.

A dyestuff of similar properties which yields dyeings having more greenish shades is obtained when using instead of copper phthalocyanine-(3)-tetrasulfonic acid chloride the equivalent amount of nickel phthalocyanine-(3)-tetrasulfonic acid chloride.

Example 2

116 parts of N-[2-nitro-4-(β-hydroxyethylsulfonyl)-phenyl]-ethylene-diamine (melting point: 151–152° C.) of the formula

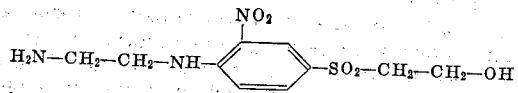

which can be prepared by reacting β-hydroxyethyl-(3-nitro-4-chloro)-phenyl-sulfone with ethylene-diamine, are suspended in 3000 parts of water. The suspension is heated to 50° C., and, while thoroughly stirring, 97 parts of copper phthalocyanine-(3)-tetrasulfonic acid chloride are introduced in the form of a moist paste, the pH-value being maintained at 9–9.5 by dropwise addition of about 270 parts of 2 N-sodium hydroxide solution. As soon as the condensation is terminated the product obtained is filtered and washed thoroughly with warm water. The moist filter cake is then stirred up with dilute hydrochloric acid, the product is filtered again, washed with water until neutral and dried at 80° C. The dry condensation product is introduced in the form of a finely ground powder into 1650 parts of concentrated sulfuric acid and the whole is stirred for several hours at room temperature. The solution obtained is poured onto a mixture of ice and NaCl solution, the precipitated dyestuff is filtered and washed with NaCl solution until neutral.

The moist filtration residue is then dissolved in 3000 parts of water; if the solution shows still a weakly acid reaction it is neutralized by addition of sodium bicarbonate. Subsequently, a solution of 50.4 parts of crystallized sodium sulfite in 200 parts of water is added and the mixture is boiled under reflux for 30 minutes. 300 grams of sodium chloride are then added while the solution is warm, and the dyestuff is isolated in the usual manner and dried. There are obtained 294 parts of a salt-containing green dyestuff of the following formula

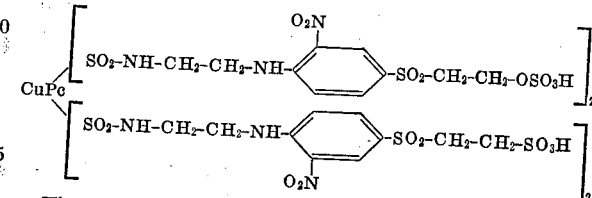

The dyestuff is easily soluble in water and may be used for dyeing and printing a cotton fabric in the presence of agents having an alkaline reaction. Bluish green dyeings are obtained having excellent fastness properties.

Dyestuffs having similar properties can be obtained when using instead of copper phthalocyanine-(3)-tetrasulfonic acid chloride the equivalent amount of nickel phthalocyanine-(3)-tetrasulfonic acid chloride or copper phthalocyanine-(4)-tetrasulfonic acid chloride.

Example 3

85 Parts of the hydrochloride of β-hydroxyethyl-[4-(β-aminoethyl)-phenyl]-sulfone corresponding to the formula given in the first paragraph of Example 1 are condensed in analogous manner with 87.2 parts of copper phthalocyanine-(3)-trisulfonic acid chloride. The batch is worked up as described in the example mentioned and the product obtained is converted by means of sulfuric acid into its acid sulfuric acid ester. There are obtained 210 parts of a salt-containing turquoise-blue dyestuff which shows similar tinctorial properties as the product described in Example 1 and which corresponds to the following formula

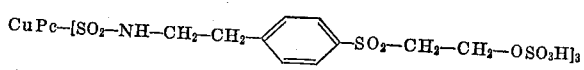

Example 4

11.5 parts of the hydrochloride of β-hydroxyethyl-[4-(β-aminoethyl)-phenyl]-sulfone corresponding to the formula given in the first paragraph of Example 1 are condensed in the manner described in Examples 1 to 3 with 12.7 parts of tetraphenyl-copper-phthalocyanine-tetrasulfonic acid chloride which is used in the form of a moist paste. 20 parts of the condensation product are obtained which is converted into its sulfuric acid ester in the manner described above. There are obtained 31 parts of a salt-containing green dyestuff which is easily soluble in water and resistant to washing when fixed on cotton fabrics with the aid of agents having an alkaline reaction. The dyestuff obtained corresponds to the following formula

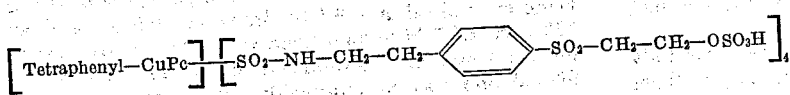

Example 5

97 parts of copper phthalocyanine-(3)-tetrasulfonic acid chloride are condensed in the manner described in Example 2 with 130 parts of N-[2'-nitro-4'-($\beta$-hydroxyethylsulfonyl)-phenyl]-piperazine of the following formula

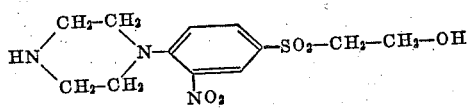

(melting point: 162–164° C.) which can be prepared by reaction of $\beta$-hydroxyethyl-(3-nitro-4-chloro)-phenylsulfone with piperazine. The condensation product is converted into its sulfuric acid ester by means of sulfuric acid. A green dyestuff is obtained which corresponds to the following formula

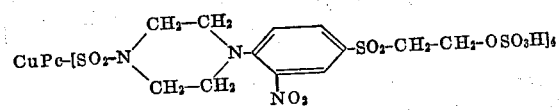

It is easily soluble in water and dyes wool and cotton green shades having excellent fastness properties.

Example 6

19 parts of N-($\beta$-hydroxyethyl)-N'-[2-methoxy-5-($\beta'$-hydroxyethylsulfonyl)-phenyl]-ethylene-diamine of the formula

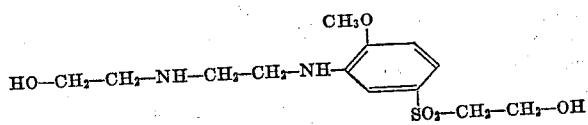

which is prepared as described below, are dissolved in 200 parts of water. 9.7 parts of copper phthalocyanine-(3)-tetrasulfonic acid chloride are introduced into this solution in the form of a moist paste, the pH-value of the solution is adjusted to 8.5 by addition of 2 N-sodium hydroxide solution, the reaction mixture is heated to 50° C. and stirred for some hours at this temperature. During the reaction time the pH-value is maintained by continuous addition of 2 N-sodium hydroxide solution. As soon as the condensation is terminated and no more sodium hydroxide solution is consumed, the condensation product formed is filtered and washed thoroughly with water. The filtration residue is dried, finely pulverized and then introduced into 140 parts of concentrated sulfuric acid and stirred for 14 hours at room temperature. Subsequently, the solution obtained is poured into a mixture of sodium chloride solution and ice, the precipitated ester dyestuff is filtered and washed with a sodium chloride solution. The moist filtration residue is dissolved in 500 parts of water and the solution is neutralized by addition of sodium bicarbonate. The dyestuff is then isolated by salting out with sodium chloride. After drying, 25 parts of a salt-containing turquoise-blue dyestuff are obtained which corresponds to the following formula

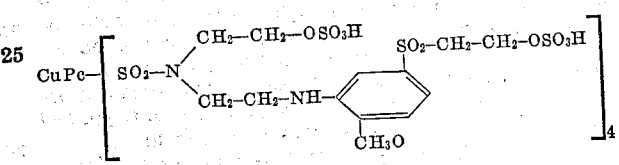

The dyestuff is very easily soluble in water and resistant excellently to washing when fixed on cotton fabrics with the aid of agents having an alkaline reaction.

The N-($\beta$-hydroxyethyl)-N'-[2-methoxy-5-($\beta'$-hydroxyethyl-sulfonyl)-phenyl]-ethylene-diamine of the formula given above used as starting product for the preparation of the dyestuff mentioned above can be prepared in the following manner:

By diazotizing $\beta$-hydroxyethyl-(3-amino-4-methoxyphenyl)-sulfone and coupling the diazonium salt obtained with diethanolamine-disulfuric acid ester in an alkaline sodium carbonate solution, the monosulfuric acid ester of 1-[2'-methoxy-5'-($\beta$-hydroxyethylsulfonyl)-phenyl]-3-($\beta'$-hydroxyethyl)-4,5-dihydro-1,2,3-triazole is obtained in the form of an inner salt (melting point: 201° C.) corresponding to the following formula

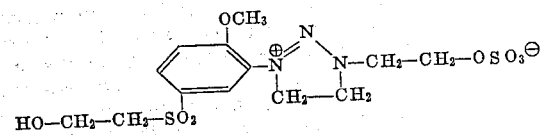

During the hydrolysis of this compound with hydrochloric acid the sulfuric acid ester group is split off and 1-[2'-methoxy-5'-($\beta$-hydroxyethylsulfonyl)-phenyl]-3-($\beta'$-hydroxyethyl)-4,5-dihydro-1,2,3-triazolium chloride is formed melting at 144° C. Catalytic hydrogenation of this product with hydrogen and Raney nickel yields N-($\beta$-hydroxyethyl)-N'-[2-methoxy-5-($\beta'$-hydroxyethyl-sulfonyl)-phenyl]-ethylenediamine of the formula given in the first paragraph of this example, in the form of a colorless oil, while splitting off ammonia.

Example 7

79.3 parts of a copper phthalocyanine-(3)-sulfonic acid chloride containing about 2.2 sulfonic acid chloride groups are introduced into a solution of 85 parts of the hydrochloride of $\beta$-hydroxyethyl-[4-($\beta$-aminoethyl)-phenyl]-sulfone in 850 parts of water, the pH-value of which has been adjusted to 9.5 by means of sodium hydroxide solution. The reaction mixture is heated to 50° C. and stirred for several hours at this temperature, the pH-value being maintained at 9.5 by continuous addition of a 2 N-sodium hydroxide solution. As soon as no more sodium hydroxide solution is consumed, the product formed is filtered and washed thoroughly with warm water. The product is dried, introduced in the form of a fine powder into 1000 parts of concentrated sulfuric acid and stirred for several hours at room temperature. Working-up is carried out in the manner described in Example 1, and 169 parts of a salt-containing blue dyestuff are obtained which is easily soluble in water and dyes wool and cotton turquoise-blue shades having excellent fastness properties. The dyestuff corresponds to the following formula

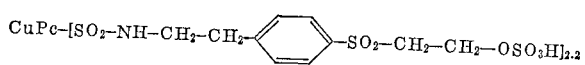

I claim:
1. The water-soluble phthalocyanine dyestuff of the formula

2. The water-soluble phthalocyanine dyestuff of the formula

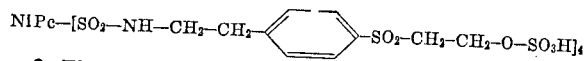

3. The water-soluble phthalocyanine dyestuff of the formula

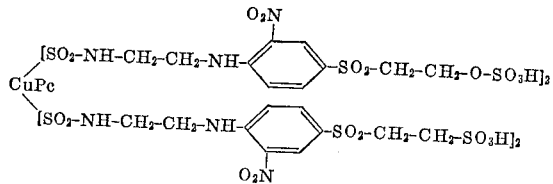

4. The water-soluble phthalocyanine dyestuff of the formula

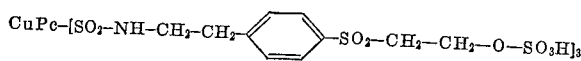

5. The water-soluble phthalocyanine dyestuff of the formula

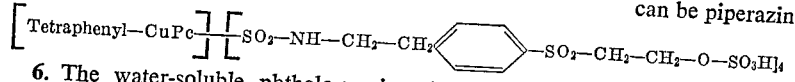

6. The water-soluble phthalocyanine dyestuff of the formula

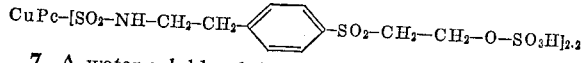

7. A water-soluble phthalocyanine dyestuff of the formula

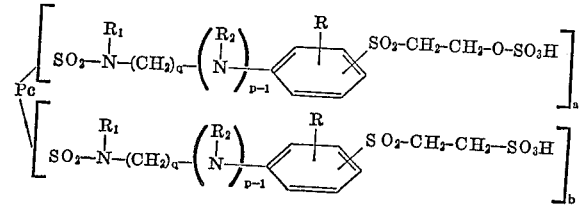

in which Pc represents a phthalocyanine nucleus containing copper, nickel, cobalt or iron, R represents hydrogen, hydroxy, lower alkoxy, carboxylic acid, sulfonic acid, nitro or halogen, $R_1$ represents hydrogen, alkyl containing 1 to 5 carbon atoms, sulfo lower alkyl, carboxyl lower alkyl, sulfato lower alkyl, halogeno lower alkyl, hydroxy lower alkyl or lower alkoxy lower alkyl, $R_2$ represents hydrogen or alkyl having 1 to 5 carbon atoms, $q$ stands for an integer of 1 to 6, each $q$ being the same in one molecule, $p$ stands for one of the integers 1 and 2, each $p$ being the same in one molecule, $a$ stands for a number of 1 to 4 and $b$ stands for a number of 0 to 3, the sum of $a$ and $b$ being at least 2 and at most 4, and the group

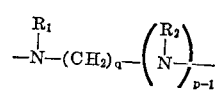

can be piperazine.

8. A water soluble phthalocyanine dyestuff of the formula

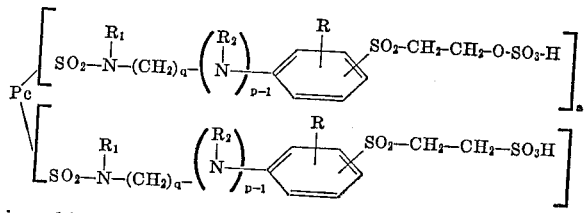

in which Pc represents copper phthalocyanine, nickel phthalocyanine or copper tetraphenyl phthalocyanine R represents hydrogen, nitro or lower alkoxy, $R_1$ represents hydrogen, alkyl having 1 to 5 carbon atoms or sulfato lower alkyl, $R_2$ represents hydrogen or alkyl having 1 to 5 carbon atoms, $q$ stands for an integer of 1 to 3, each $q$ being the same in one molecule, $p$ stands for one of the integers 1 and 2, each $p$ being the same in one molecule, $a$ stands for a number of 1 to 4 and $b$ stands for a number of 0 to 3, the sum of $a$ and $b$ being at least 2 and at most 4, and the group

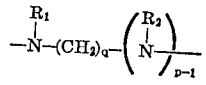

can be piperazine.

References Cited
UNITED STATES PATENTS

| | | | |
|---|---|---|---|
| 3,062,830 | 11/1962 | Buc et al. | 260—314.5 |
| 3,133,059 | 5/1964 | Clark et al. | 260—314.5 |
| 3,148,933 | 9/1964 | Randall et al. | 260—314.5 |
| 3,235,540 | 2/1964 | Dortmann et al. | 260—314.5 |
| 3,238,221 | 3/1966 | Schmitz et al. | 260—314.5 |

FOREIGN PATENTS 1,286,992  1/1962  France.

HENRY R. JILES, *Primary Examiner.*

H. I. MOATZ, *Assistant Examiner.*